United States Patent Office 2,731,301
Patented Jan. 17, 1956

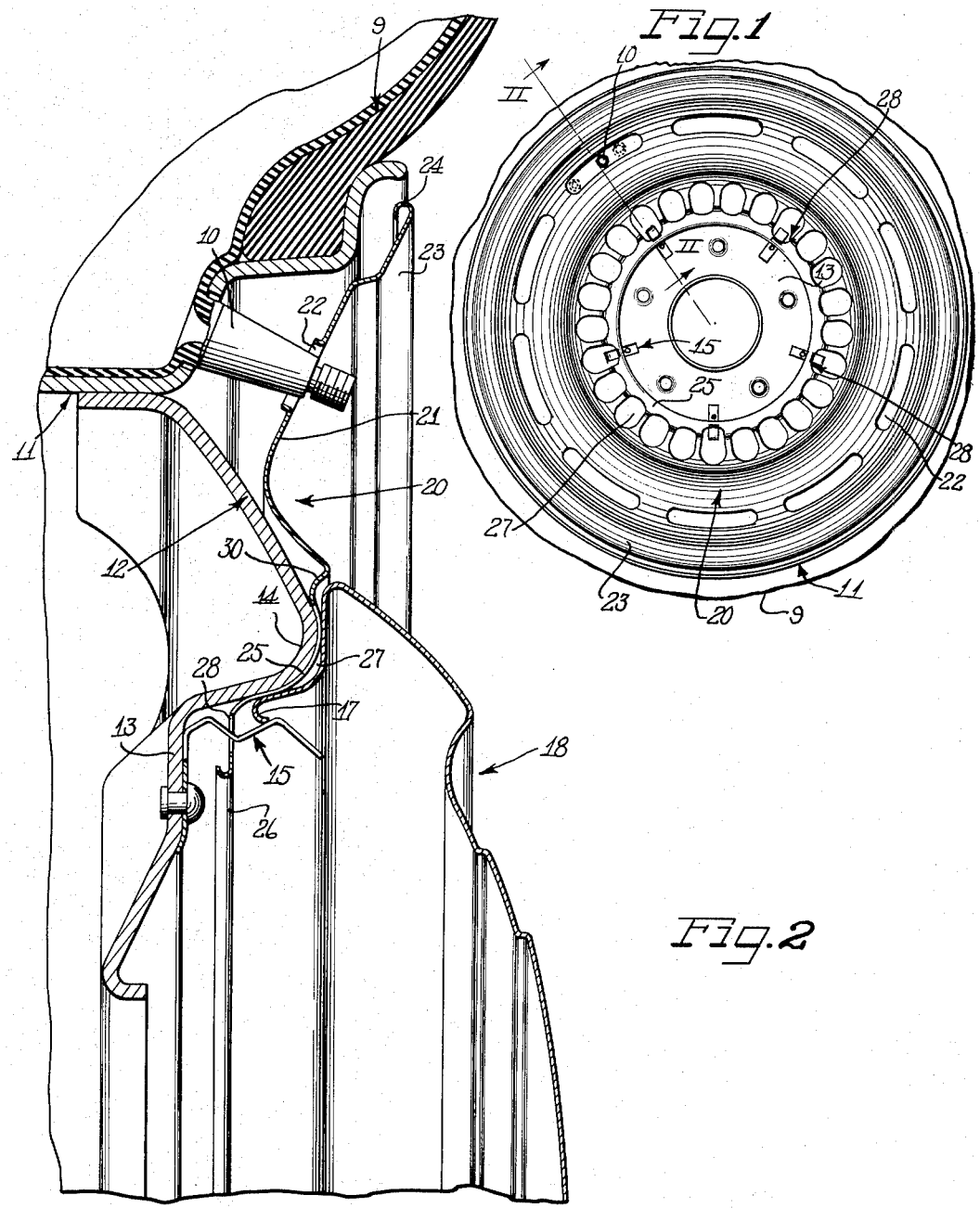

2,731,301

WHEEL COVER

George Albert Lyon, Detroit, Mich.

Application December 28, 1951, Serial No. 263,762

6 Claims. (Cl. 301—37)

This invention relates to wheel covers and more particularly to a cover which can be adjusted with facility to conform readily with a part of the wheel which it engages.

In the manufacture of wheels and especially of the dished stamping comprising the body part of the wheel there is a considerable allowable manufacturing tolerance. For illustration, the wheel body may vary as much as one-eighth of an inch in its relation to the tire rim which it carries.

Now, I propose, in accordance with this invention, to provide a cover which can resiliently embrace and adjust itself to a bulged portion of the wheel body of the wheel.

Another object of this invention is to provide a wheel cover which will permit of hub cap retaining springs projecting therethrough and will, at the same time, adjustably enable the valve stem to project through another aperture in the cover even though the cover may be turned slightly in being fitted over the spring clips.

Still another object of the invention is to provide a wheel cover which lends itself to economical manufacture on a large production scale.

In accordance with the general features of this invention there is provided a wheel cover which may be either in the form of an annulus or a complete disc and which has a central or intermediate portion dished to conform to and adjustably engage over a bulged or nose portion of the wheel body and which is apertured to augment the resilient flexibility of the dished portion whereby it may readily and tightly engage the bulged portion of the wheel body.

Other features of the invention relate to enlarging certain of the apertures in the central portion of the cover so that hub cap retaining spring clips may project therethrough.

Still another feature of the invention relates to providing an outer portion of the cover with an aperture elongated in a circumferential direction so as to enable a valve stem to project therethrough irrespective of slight angular displacement of the cover relative to the valve stem due to its being engaged over the spring clips.

Other objects and features of this invention will more fully appear from the following detailed description taken in connection with the accompanying drawing which illustrates a single embodiment thereof and in which:

Figure 1 is a fragmentary front elevation of a wheel equipped with my novel cover and with the hub cap removed to show the manner in which the spring clips project through enlarged apertures in the wheel cover; and Figure 2 is an enlarged fragmentary cross sectional view taken on the line II—II of Figure 1 looking in the direction indicated by the arrows and showing the hub cap in clamping engagement with the apertured resilient central portion of the cover.

As shown on the drawing:

The reference character 9 designates generally a conventional pneumatic tire and tube assembly having the usual valve stem 11 and which tire assembly is carried in the usual way upon a conventional multi-flange drop center tire rim 11.

The tire rim 11 is carried upon a so-called wheel body member 12 which comprises a dished metallic stamping. In the manufacture of this stamping considerable manufacturing tolerance is allowed such, for example, as much as one-eighth of an inch in its location relative to the tire rim 11.

This body member has a central bolt-on flange 13 adapted to be detachably fastened in the usual way to a brake drum or the like on an axle as by means of cap screws or bolts (not shown).

The body member 12 has a bulged or nose portion 14 extending axially between the rim and the bolt-on flange 13. The bolt-on flange also carries a series of hub cap retaining spring clips 15 which are of a conventional goose-neck construction and are formed for retaining cooperation with the turned edge 17 of the skirt of a hub cap 18. This construction insofar as it goes is of a conventional design.

My invention is concerned with the provision of a wheel cover or disc 20 adapted to be retainingly clamped to the nose portion 14 of the wheel body by the detachable hub cap 18. This wheel cover 20 comprises a metallic stamping and includes an annular outer portion 21 provided with a series of elongated openings 22 each of which is of a size to permit of the valve stem 10 projecting therethrough. The outer margin of this portion 21 is ribbed at 23 and has a turned edge 24 for reinforcing the cover. This turned edge 24 is slightly spaced from the rim 11 so that air may circulate behind the cover and whereby a pry-off tool may be inserted under the edge 24 when it is desired to remove the cover from the wheel.

The cover 20 also has a dished central or intermediate portion 25 which is curved generally to conform with the curvature of the nose portion 14 of the wheel body 12 so that it can snugly nest thereover. This curved portion 25 terminates in a central reinforced turned edge 26 located radially inward of the nose portion 14.

The curved dished intermediate portion 25 of the cover has a series of apertures 27 arranged in annular form and certain of which are enlarged at 28 to permit the spring clips to project therethrough. Obviously, the wheel may have any suitable number of spring clips although it is customary to use from three to five of them on the wheel for holding a hub cap or cover on the wheel. I have in Fig. 1 shown five of such spring clips and, accordingly, five of the openings 27 are enlarged at 28. These enlarged openings 28 are equidistantly spaced about the axis of the wheel.

Now I find that by providing the curved dished portion 25 of the cover 20 with the apertures 27 and 28, I am enabled to augment the resilient flexibility of this portion so that it may be resiliently flexed into snug engagement with the nose portion 14 of the wheel body when the cover is clamped to the wheel body by the hub cap 18.

In the application of the cover 20 to the wheel the equidistantly spaced enlarged apertures 28 are first aligned with the spring clips and the cover is then pressed axially home against the wheel body 12, thereby permitting the clips to pass through the openings 28 and also permitting the valve stem 10 to pass through one of the openings 22. As shown by dotted lines in Fig. 1, the valve stem 10 can be adjustably received by an opening due to the fact that the opening is elongated. In other words, if the valve stem is angularly displaced slightly with reference to the spring clips, any one of the openings 22 can still accommodate and permit of the valve stem passing therethrough.

After the cover has been placed on the wheel it will be temporarily held on the wheel against accidental falling off by the spring clips 15 until the hub cap is pressed into engagement with the clips. During the pressing of the hub cap axially into the wheel body the turned edge 17 of the hub cap engages the free extremities of the clips 15, camming them inwardly until the edge 17 snaps behind the humps of the clips at which time the clips forcibly press the cap toward the nose portion 14 of the wheel body. This results in the hub cap exerting clamping pressure against the apertured resilient dished portion 25 of the cover whereby this portion is resiliently flexed to conform to and tightly fit the wheel nose portion 14. Thereafter the cover is retainingly held on the nose portion 14 through the resilient snap-on engagement thereof by dished portion 25. The cover and cap may be easily disengaged from the wheel by a suitable pry-off tool such as a screw driver or the like.

It will be observed in Figure 2 that the cover is provided with an annular reinforcing rib 30 which surrounds the hub cap 18. It will be apparent that the rib 30 in conjunction with the outer marginal rib 23 will prevent undue vibration of the outer portion of the cover, while the rib 30 further will act as a fulcrum during pry-off of the hub cap 18.

I claim as my invention:

1. In a cover structure for a wheel including a tire rim supported on a dished wheel body having an annular bulge and having cover retaining spring clips radially inward of the bulge, a wheel cover comprising a circular member having a dished portion for nesting over said wheel bulge and apertured opposite the bulge to enhance the resilient flexibility of said portion whereby it can more readily feed over and retainingly engage said bulge, certain of the apertures in the dished portion being enlarged in a radial direction so that said spring clips can project therethrough.

2. In a cover structure for a wheel including a tire rim having projecting therefrom a valve stem, a wheel body for supporting the rim and having a central axially outward bulge, hub cap retaining clips carried by the body member radially inward of the bulge and a hub cap for engagement by said clips, a wheel cover for the wheel including a portion projecting radially outwardly from the hub cap and a portion underlying the hub cap and apertured opposite said bulge to augment the resilient flexibility of the underlying portion whereby it can more readily accommodate itself to the shape of the bulge beneath the hub cap and be clamped to the wheel body by said hub cap, certain of the apertures in said portion being elongated to accommodate the spring clips projecting therethrough and whereby said spring clips can detachably engage the hub cap.

3. In a cover structure for a wheel including a tire rim having projecting therefrom a valve stem, a wheel body for supporting the rim and having a central axially outward bulge, hub cap retaining clips carried by the body member radially inward of the bulge and a hub cap for engagement by said clips, a wheel cover for the wheel including a portion projecting radially outwardly from the hub cap and a portion underlying the hub cap and apertured opposite said bulge to augment the resilient flexibility of the underlying portion whereby it can more readily accommodate itself to the shape of the bulge beneath the hub cap and be clamped to the wheel body by said hub cap, certain of the apertures in said portion being elongated to accommodate the spring clips projecting therethrough and whereby said spring clips can detachably engage the hub cap, said outer portion of the cover having an aperture elongated in a circumferential direction through which the valve stem can project and whereby the cover can be adjusted angularly of the valve stem in the aligning of the clips with the enlarged apertures.

4. As an article of manufacture a circular wheel cover having a centrally dished portion formed to fit over and engage a part of a wheel body, said portion being provided with a series of apertures arranged in an annulus for augmenting the resilient flexibility of said portion and whereby said portion may be flexed when it is clamped to the wheel body, certain of the apertures in said portion being enlarged radially inwardly so that hub cap retaining spring clips can project through said enlarged portions of the apertures.

5. In a wheel structure including a tire rim and a wheel body for supporting the rim and having an intermediate annular axially outward bulge and a generally radially extending bolt-on central flange portion with hub cap retaining clips carried by said flange portion and a hub cap for engagement by said clips, a wheel cover for disposition at the outer side of the wheel including a portion arranged to project generally radially outwardly from the hub cap and a portion to underlie the hub cap, said underlying portion of said wheel cover including a generally axially outwardly dished portion for generally conforming with the wheel body bulge and a generally radial portion for extending in spaced relation to said wheel body flange portion, said last mentioned generally radial portion terminating in an annularly continuous edge, and said underlying portion having elongated generally radial slots of substantially greater transverse extent than the web portion extending between adjacent slots, said slots being disposed to receive the hub cap retaining clips therethrough, and said continuous edge serving to retain said cover on said clips prior to attachment of said hub cap, said slots augmenting the resilient flexibility of the underlying portion whereby it can more readily accommodate itself to the shape of the bulge, and said continuous edge maintaining and securing said web portions against misalignment and guarding the radially inner edges thereof.

6. In a wheel structure including a tire rim having a valve stem projecting therefrom and a wheel body supporting the tire rim and provided with a central dished bolt-on flange having cover retaining means, a cover for the outer side of the wheel having an inner portion for engagement with the wheel body and engageable in a torsionally substantially fixed relationship with said retaining means, said cover having a radially outer annular inwardly dished portion for overlying the tire rim in spaced relation and projecting toward the valve stem, said dished portion being provided with an annular series of apertures each of which is adapted for projection therethrough of the valve stem, said apertures being elongated in a circumferential direction for receiving the valve stem therethrough in a plurality of orientations of the cover in a circumferential sense whereby to accommodate substantial circumferential relative assembly tolerance of the tire rim and wheel body with nevertheless undistorted projection through the aperture of the valve stem.

References Cited in the file of this patent

UNITED STATES PATENTS

| | | |
|---|---|---|
| 1,712,322 | Bachrach | May 7, 1929 |
| 2,166,216 | Lyon | July 18, 1939 |
| 2,422,689 | Lyon | June 24, 1947 |
| 2,491,504 | Lyon | Dec. 20, 1949 |
| 2,504,995 | Lyon | Apr. 25, 1950 |